United States Patent Office 3,294,590
Patented Dec. 27, 1966

3,294,590
ELECTROCHEMICAL CELL
Frank Solomon, Lake Success, N.Y., assignor to Yardney International Corp., New York, N.Y., a corporation of New York
Filed Nov. 1, 1962, Ser. No. 236,762
14 Claims. (Cl. 136—120)

This application is a continuation-in-part of my abandoned application Ser. No. 696,174, filed November 13, 1957.

This invention relates to silver and its oxides and more particularly to silver and its oxides as used for electrodes in electrochemical cells.

Silver and its oxides have been used as active electrode materials for primary cells since the early days of Sir Humphrey Davy and in rechargeable cells since H. André introduced semipermeable separators and discovered the need for inter-electrode pressures, as disclosed in U.S. Patent Nos. 2,594,705 to 2,594,714.

It is known that the silver oxide electrodes of the type disclosed in said André patents charge at two voltage levels generally referred to as the argentous oxide level and argentic oxide level. In some applications of these batteries, the existence of these two levels are a disadvantage.

It is an object of the present invention to provide a silver electrode which will charge fully to the argentous (or oxide) level but which will not accept substantial charge at the argentic (or peroxide) voltage level.

It is a further object of this invention to provide a suitable method of making an electrode having the characteristic set forth above.

It is also an object of the present invention to provide a method of making silver suitable for use in an electrode set forth above.

It is still a further object of this invention to provide an electrochemical cell in which is incorporated the electrode set forth above.

These and other objects and consequent advantages will be apparent from the detailed description of the invention herein disclosed.

In the accompanying drawing:

FIG. 1 shows a characteristic charging curve for a conventional silver electrode; and FIG. 2 shows a comparable curve for an electrode according to the invention.

The major feature of this invention is the preparation of electrodes for electrochemical cells from a special silver and oxides prepared from this silver having the property, due to characteristic particle size, of being chargeable to full capacity at argentous level at voltages below those necessary for argentic charging. Such electrodes are fabricated from silver particles which measure at most about 2.5μ as determined by the Fisher "Sub-Sieve Sizer." Of particular interest are electrodes made of silver particles which are at most .8 micron in size as measured by the above-mentioned method.

The Fisher "Sub-Sieve Sizer" is a well known device, manufactured by Fisher Scientific Company, Pittsburgh, Pennsylvania, which is used in industry to measure the particle size of powders and particularly the particle size of powders which may not be accurately measured by other methods such as the sieve sizers. The instrument is based on the principle that particles in the path of a regulated air flow will affect that air flow in relationship to their size. The pressure of the air which has passed through the test sample is measured by a manometer. The liquid level in the manometer is higher or lower depending on the resistance of the test sample to the passage of air. The size of the particles is then read directly from a series of curves as indicated by the fluid level in the manometer. This is reported as the "average particle size." This air permeability principle is described in Industrial and Engineering Chemistry, Analytical Edition, 12: 479–482, 1940.

The small or fine particles of silver are responsible for the characteristics of the electrodes prepared in accordance with this invention. The particle size of the silver powder is sufficiently small so as to be capable of anodic oxidation in an alkaline electrolyte to only the argentous level before onset of substantial oxygen evolution.

Conventional silver powders used for electrode fabrication have particle sizes in excess of 6.5μ and have "fines" of under 5μ that seldom exceed 10% of the weight of the total powder. Such powders when compressed into electrodes, either with or without sintering, possess the characteristic "charging curve" of FIG. 1. Electrodes prepared from silver oxides which are thermally reduced to silver at sintering temperatures, i.e. in the range of 350°–900° C., also possess charging curves similar to that of FIG. 1.

The silvers of this invention on the other hand possess a typical charging curve as indicated in FIG. 2. The curves of FIGS. 1 and 2 when compared show a characteristic electrochemical difference between the two silvers that results from their particle-size difference. Silver electrodes having the charging characteristics of FIG. 1 charge to the argentous level for about 10% to 30% of their capacity and to the argentic level for the rest of the charging period. As a result, upon discharge, the initial voltage will always be the voltage characteristic of the argentic portion of the curve, i.e. 1.86 volts in the case of the silver-zinc cell or 1.40 volts in the case of the silver-cadmium cell. Not until most of the argentic oxide has been discharged will the cell yield the characteristic argentous voltage, i.e. 1.60 volts in Ag-Zn cells and 1.14 volts in Ag-Cd cells. This may be as much as 30% of total charged capacity and necessitates use of special circuits designed for operation at both voltages. In contrast FIG. 2 shows that the silver of this invetnion charges to 45% of theoretical capacity based on both silver levels, i.e. 90% of charged capacity at the argentous level. This novel silver can receive no substantial further charge even at the argentic level by reason of the characteristic passivation of the electrode at argentic voltages.

From the point of view of efficiency, cells of conventional silver, charged to both levels, achieve an average silver utilization in the range of 3.08–4.5 gm./amperehour with a theoretical silver-utilization limit of 2 gm./a.h. The silver according to this invention gives a silver utilization of 4.5–5.3 gm./a.h. with a theoretical utilization limit of 4 gm./a.h.

Silvers useful for the purpose of this invention may be prepared in accordance with the following examples:

*Example 1*

One hundred grams of $Ag_2O$ having particle size, as determined by the Fisher "Sub-Sieve Sizer," of 2.5μ (microns) are suspended in 240 cc. of 10% solution of KOH. To the agitated slurry is slowly added a mixture of 50 cc. of 37% formaldehyde and 50 cc. of water. The reaction mixture is agitated until all gas evolution is completed. The material is then filtered and the precipitate is washed with water until the effluent is neutral to litmus. The resultant silver powder is then air-dried. Its particle size range is similar to that of the oxide from which it is prepared. The powder is pressed into an electrode and charged against zinc electrodes, in a conventionally constructed silver-zinc cell. The cell so constructed accepts charge at voltage according to the curve of FIG. 2. The major portion of the charge is at the argentous voltage, i.e. A–B–C. It should be noted that at point C the charging voltage starts to rise to 1.90 volts, levels off, briefly, at point D and then proceeds to rise once again until at 2.05 volts electrolysis of the water in the electrolyte starts and the gas evolution precludes further charging.

*Example 2*

One hundred grams of $Ag_2O$ having an average particle size, as determined in the Fisher "Sub-Sieve Sizer," of $2.0\mu$ is layered on a horizontal cathode immersed in 20% KOH solution. Perforated stainless-steel anodes are placed in the electrolyte above the oxide layer. When the circuit is closed, gas is evolved at the anode. The conversion of 100 gms. of $Ag_2O$ to silver required approximately 30 a.h., indicating less than 100% cathode efficiency. The silver was washed and dried. The resultant silver powder has an average particle size of $2.0\mu$, i.e. approximately that of the silver oxide. Charging curves of electrodes prepared from this electrolytically reduced silver have the same charging characteristics as the silver produced according to Example 1, indicating that the electrochemical characteristics of this silver are identical with those of the chemically reduced material.

*Example 3*

The procedure of Example 1 is repeated except that, in place of the $2.5\mu$ $Ag_2O$, there is employed $Ag_2O$ having a particle size of about $.8\mu$ as measured by the Fisher "Sub-Sieve Sizer." The silver powder obtained, which has a particle size of about $.8\mu$ is used to construct the electrode.

In contrast to the above materials, electrodes prepared by thermal decomposition of silver oxide at temperatures over 150° C., thus under conditions favoring crystal growth and particle agglomeration, give conventional charging curves such as the one illustrated in FIG. 1 with a short charging period on the argentous level A–C and with the major part of the energy input on the argentic level D–E. When the total energy input of the battery is reached, the charging voltage rises to level F and the additional energy is expended in electrolyzing the water of the electrolyte.

Silver-zinc batteries and cells with positive plates containing silver as herein disclosed have been prepared and tested against conventional control cells through continuous charge-overcharge-discharge cycles and then dismantled. As could be expected, cells having electrodes made from ordinary silver showed extensive evidence of penetration of the separator by zinc crystals growing from the negative-electrode face. In contrast, the separators of cells with electrodes incorporating the silver of this invention showed, after cycling, only traces of zinc as determined by chemical means but no extensive zinc permeation such as could result in short circuits between the positive and negative electrodes.

From experimental work, it has been determined that silvers suitable for cells of this particular type, i.e. cells containing silver positive electrodes that are used in combination with negative electrodes of a metal more electronegative than silver and are capable of being charged only to the argentous level, can be prepared by any of the known methods of silver preparation that will yield silvers having a particle size of below about $2\mu$ as measured by the Fisher "Sub-Sieve Sizer." In addition to the two methods set forth in the examples above, any method including for example mechanical attrition, electrochemical deposition from soluble salts, photochemical reduction and photographic reduction of halides which will yield silvers of the particle sizes indicated may be used.

The electrodes are fabricated in the known ways including pasting the silver powder (or its oxides) in and on grids, or compacting it in a press around current-collecting conductors. In any case, however, care should be taken to minimize growth in particle size, through the avoidance of temperatures above approximately 150° C.

Whereas the invention has been described with reference to specific forms thereof, it will be understood that many changes and modifications may be made without departing from the spirit and scope of the appended claims.

What is claimed is:

1. In an electrochemical device having a positive electrode, a negative electrode and an electroylte, the improvement whereby said positive electrode comprises an active material consisting of silver composed essentially of particles having a particle size as measured by the Fisher "Sub-Sieve Sizer" of not more than about 2.5 microns.

2. An electrochemical device according to claim 1 wherein said silver is capable of being charged at the argentous level to the extent of at least about 45% of the theoretical capacity of said electrode based on the total amount of silver in the electrode.

3. An electrochemical device according to claim 1 wherein the silver employed gives a silver utilization in the range of about 4.5 to 5.3 gm./ampere-hour in an alkaline silver-zinc battery system.

4. In an electrochemical device having a positive electrode, a negative electrode and an electrolyte, the improvement whereby said positive electrode comprises an active material consisting of silver powder composed essentially of particles having a particle size as measured by the Fisher "Sub-Sieve Sizer" of not more than about 2.5 microns, the silver of said electrode being capable of being charged at the argentous level to the extent of at least about 45% of the theoretical capacity of said electrode based on the total silver of said electrode, said silver giving a silver utilization in the range of about 4.5 to 5.3 gm./ampere-hour with a theoretical limit of 4 gm./ampere-hour in a silver-zinc system.

5. An electrochemical device comprising a positive electrode, a negative electrode and an electroylte therebetween, said positive electrode comprising an active material consisting of silver composed essentially of particles having a particle size as measured by the Fisher "Sub-Sieve Sizer" of not more than about 2.5 microns.

6. An electrochemical device according to claim 5 wherein said silver is capable of being charged at the argentous level to the extent of at least about 45% of the theoretical capacity of said electrode based on the total amount of the silver in the electrode.

7. An electrochemical device according to claim 5 wherein the silver employed under use gives a silver utilization in the range of about 4.5 to 5.3 gm./ampere-hour.

8. An electrochemical cell comprising a positive silver electrode, a negative zinc electrode and an alkaline electrolyte therebetween, said silver electrode consisting of silver composed essentially of particles having a particle size as measured by the Fisher "Sub-Sieve Sizer" of not more than about 2.5 microns; said silver being capable of being charged at the argentous level to the extent of at least about 45% of the theoretical capacity of said silver electrode based on the total amount of silver contained therein, said cell showing a silver utilization in the range of about 4.5 to 5.3 gm./ampere-hour.

9. In an electrochemical device having a positive electrode, a negative electrode and an electrolyte, the improvement whereby said positive electrode comprises an active material consisting of silver composed essentially of particles having a particle size as measured by the Fisher "Sub-Sieve Sizer" of not more than about .8 micron.

10. An electrochemical device according to claim 9 wherein said silver is capable of being charged at the argentous level to the extent of at least about 45% of the theoretical capacity of said electrode based on the total amount of silver in the electrode.

11. An electrochemical device according to claim 9 wherein the silver employed gives a silver utilization in the range of about 4.5 to 5.3 gm./ampere-hour in an alkaline silver-zinc battery system.

12. In an electrochemical device having a positive electrode, a negative electrode and an electrolyte, the improvement whereby said positive electrode comprises an active material consisting of silver powder composed essentially of particles having a particle size as measured by the Fisher "Sub-Sieve Sizer" of not more than about .8 microns, the silver of said electrode being capable of being charged at the argentous level to the extent of at least about 45% of the theoretical capacity of said electrode based on the total silver of said electrode, said silver giving a silver utilization in the range of about 4.5 to 5.3 gm./ampere-hour with a theoroetical limit of 4 gm./ampere-hour in a silver-zinc system.

13. An electrochemical device comprising a positive electrode, a negative electrode and an electrolyte therebetween, said positive electrode comprising an active material consisting of silver composed essentially of particles having a particle size as measured by the Fisher "Sub-Sieve Sizer" of not more than about .8 micron.

14. An electrochemical cel comprising a positive silver electrode, a negative zinc electrode and an alkaline electrolyte therebetween, said silver electrode consisting of silver composed essentially of particles having a particle size as measured by the Fisher "Sub-Sieve Sizer" of not more than about .8 micron; said silver being capable of being charged at the argentous level to the extent of at least about 45% of the theoretical capacity of said silver electrode based on the total amount of silver contained therein, said cell showing a silver utilization in the range of about 4.5 to 5.3 gm./ampere-hour.

References Cited by the Examiner

UNITED STATES PATENTS

| | | | |
|---|---|---|---|
| 2,594,712 | 4/1952 | Andre | 136—6 |
| 2,681,375 | 6/1954 | Vogt | 136—20 |
| 2,752,237 | 6/1956 | Short | 75—118 |
| 2,818,462 | 12/1957 | Solomon | 136—21 |
| 2,849,519 | 8/1958 | Freas et al. | 136—20 |
| 2,853,374 | 9/1958 | Schaufelberger | 75—0.55 |
| 2,860,044 | 11/1958 | Brundin | 75—0.55 |
| 3,049,421 | 8/1962 | Allen et al. | 75—0.5 |
| 3,201,223 | 8/1965 | Cuhra et al. | 75—118 |

WINSTON A. DOUGLAS, *Primary Examiner.*

JOHN H. MACK, *Examiner.*

W. VAN SISE, A. SKAPARS, *Assistant Examiners.*